United States Patent [19]

Perry, Jr. et al.

[11] Patent Number: 5,827,430
[45] Date of Patent: Oct. 27, 1998

[54] CORELESS AND SPIRALLY WOUND NON-WOVEN FILTER ELEMENT

[75] Inventors: Marney Dunman Perry, Jr., Mineral Wells; Stephen A. von Phul, Weatherford; Nolan Glover, Mineral Wells; H. C. Bradford, Mineral Wells; Floyd Roberts, Mineral Wells, all of Tex.

[73] Assignee: Perry Equipment Corporation, Mineral Wells, Tex.

[21] Appl. No.: 547,352

[22] Filed: Oct. 24, 1995

[51] Int. Cl.$^6$ ................................................. B01D 27/06
[52] U.S. Cl. .................... 210/497.01; 210/504; 210/505; 210/508; 156/195; 156/280; 428/36.3; 428/36.91
[58] Field of Search ................................ 210/494.1, 496, 210/497.01, 497.1, 497.2, 503, 504, 505, 506, 508; 264/257, 258; 156/195, 191, 280; 428/36.2, 36.3, 36.92, 36.91

[56] References Cited

U.S. PATENT DOCUMENTS

| | | | |
|---|---|---|---|
| 2,703,441 | 3/1955 | Langdon et al. | 19/156 |
| 2,744,294 | 5/1956 | Buresh et al. | 19/67 |
| 2,890,497 | 6/1959 | Langdon et al. | 19/156 |
| 3,225,848 | 12/1965 | Wise et al. | 177/80 |
| 3,399,092 | 8/1968 | Adams et al. | 156/74 |
| 3,744,092 | 7/1973 | Auten | 19/156.3 |
| 3,755,028 | 8/1973 | Wood | 156/62.2 |
| 3,766,607 | 10/1973 | Jende et al. | 19/156.3 |
| 3,768,119 | 10/1973 | Wood | 19/156.3 |
| 3,910,703 | 10/1975 | Burns et al. | 356/169 |
| 3,920,428 | 11/1975 | Kinsley, Jr. | 55/528 |
| 4,101,423 | 7/1978 | Merrill et al. | 210/494 M |
| 4,398,931 | 8/1983 | Shevlin | 55/341 R |
| 4,475,973 | 10/1984 | Tanaka et al. | 210/497.1 |
| 4,586,760 | 5/1986 | Welker | 312/245 |
| 4,792,397 | 12/1988 | Rasmussen | 210/314 |
| 4,838,905 | 6/1989 | Billiet et al. | 55/486 |
| 4,839,037 | 6/1989 | Bertelsen et al. | 210/97 |
| 4,902,417 | 2/1990 | Lien | 210/321.74 |
| 4,944,996 | 7/1990 | Bauer et al. | 428/307.7 |
| 4,961,974 | 10/1990 | Jones | 428/34.2 |
| 4,986,909 | 1/1991 | Rai et al. | 210/198.3 |
| 5,096,591 | 3/1992 | Benn | 210/651 |
| 5,114,582 | 5/1992 | Sandstrom et al. | 210/321.74 |
| 5,120,331 | 6/1992 | Landy | 55/74 |
| 5,141,643 | 8/1992 | Breitbach et al. | 210/504 |
| 5,230,726 | 7/1993 | Smith et al. | 55/487 |
| 5,232,595 | 8/1993 | Meyer | 210/493.1 |
| 5,264,162 | 11/1993 | Salem et al. | 264/29.5 |
| 5,266,195 | 11/1993 | Hopkins | 210/321.74 |

(List continued on next page.)

FOREIGN PATENT DOCUMENTS

| | | | |
|---|---|---|---|
| 2582956 | 12/1986 | France | B01D 13/02 |
| 1950068 | 6/1970 | Germany . | |
| 2005938 | 8/1971 | Germany | C02B 9/00 |
| 2531401 | 1/1976 | Germany | B01D 39/08 |
| 3513062A1 | 10/1986 | Germany | B01D 29/06 |
| 3522725A1 | 1/1987 | Germany | B01D 39/14 |
| 1538902 | 1/1979 | United Kingdom | B01D 29/02 |

OTHER PUBLICATIONS

PCT International Search Report (PCT/US96/16497).

*Primary Examiner*—W. L. Walker
*Attorney, Agent, or Firm*—Charles D. Gunter, Jr.

[57] ABSTRACT

A homogeneous mixture of a base and a binder material or fiber that is compressed to form a mat or sheet of selected porosity. The binder material has at least a surface with a melting temperature lower than that of the base fiber. The sheet is formed into a selected geometric shape and thermally fused to bind the base fiber into a porous filter element. The preferred shape is a helically wound tube of plural sheets, each sheet being self-overlapped and compressed to overlap another sheet. Each sheet preferably heated and compressed individually and the sheets may be selected to have different porosities and densities. The binder fiber is selected from the group consisting of thermoplastic and resin, and the base fiber is selected from the group consisting of thermoplastic and natural.

11 Claims, 7 Drawing Sheets

U.S. PATENT DOCUMENTS

| | | | |
|---|---|---|---|
| 5,271,850 | 12/1993 | Stutzman | 210/767 |
| 5,273,818 | 12/1993 | Kim et al. | 210/506 |
| 5,298,046 | 3/1994 | Peisert | 55/486 |
| 5,304,312 | 4/1994 | Forster et al. | 210/808 |
| 5,393,601 | 2/1995 | Heinrich et al. | 210/508 |
| 5,409,515 | 4/1995 | Yamamoto et al. | 55/341.1 |
| 5,424,907 | 6/1995 | Gross et al. | 264/45.7 |
| 5,503,745 | 4/1996 | Ogata et al. | 210/504 |

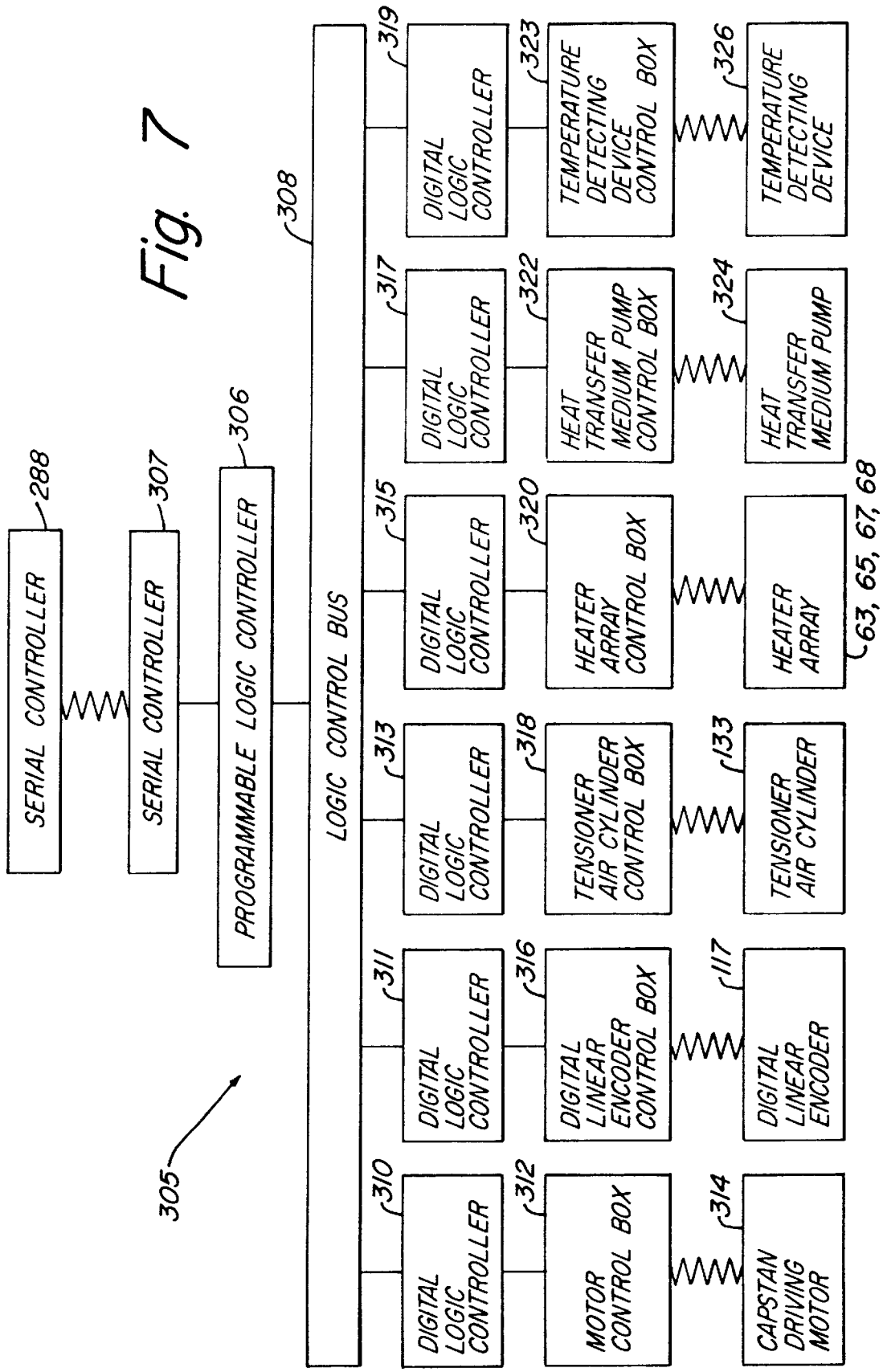

CORELESS AND SPIRALLY WOUND NON-WOVEN FILTER ELEMENT

BACKGROUND OF THE INVENTION

1. Field of the Invention

The present invention relates to filter elements and to the machines and methods used in their manufacture.

2. Background Information

There are machines used to manufacture tubular filter elements in a continuous process. U.S. Pat. No. 4,101,423 discloses a tubular filter element made on a single-stage multiple winding machine of helically wound and overlapping layers such as an inner layer of high wet strength, highly porous paper, a second layer of thin microporous filtration material of a sterilizing grade and an outer layer of a porous sheet of expanded polyethylene and an outer porous layer to support the filtration material. The layers are wrapped on a fixed mandrel to be self-overlapping in a single layer overlap and advance in unison along the mandrel as they are wrapped so that there is no relative motion between the adjacent layers of the laminate. An adhesive material that blocks the passage of the particulate matter and bacteria being filtered seals the second filtration layer in the region of overlap. The ends of the tubular laminate construction are impregnated over a predetermined length adjacent to each edge of the construction with a suitable sealing adhesive material such as a polyurethane potting compound. When the adhesive material cures, the end portions provide mechanical support for the tube while blocking the passage of the fluid or the particulate and bacterial contaminants. (See Col. 5, Ins. 4–26.)

A circularly wound spiralled chromatographic column is shown in U.S. Pat. No. 4,986,909. Here, a sandwich or laminate of alternating layers of swellable fibrous matrix in sheet form and layers of spacer means, with the periphery of the sandwich is compressed into a fluid-tight configuration. Typically, the peripheral edges of alternating discs of swellable fibrous matrix and spacer means are joined. Preferably, the fibrous matrix contains or has bonded therein a thermoplastic polymeric material, as does the spacer means. The edges may be joined by appropriate heating, e.g. sonic welding. (See Col. 10, Ins. 40–61.)

Another spirally, circularly wound filter element is disclosed in U.S. Pat. No. 5,114,582 and comprises one or more filter elements spirally wound on a cylindrical permeate transport tube. Each filter element comprises a heat-sealed membrane element and a feed spacer. (See Abstract.)

A process for the manufacture of porous tubes of high permeability made from a carbon—carbon composite material in a strip of mat spirally wound on a mandrel is disclosed in U.S. Pat. No. 5,264,162. Porous tubes are made from said material by winding over a mandrel a nonwoven sheet, made from a carbon fiber precursor, followed by compression and hot stabilization of the assembly. The sheet is impregnated by a resin, followed by a thermal carbonization treatment of the resin. Tubes are obtained having a high permeability, small pore diameter and an inner surface of low rugosity. (See Abstract.) Also disclosed is the use of successive mat layers, making it possible to obtain, in the final tube, pore diameters which increase in the direction of the flux to be filtered, generally from the inside towards the outside of the tube. It is advantageous that these pore diameters are substantially in a ratio of 10 between one layer and the next, which may be obtained by adjusting the density of the mat and/or the diameter of the fibers. (See Col. 4, Ins. 10–20.)

A helically wound, single wrap filter element is disclosed in U.S. Pat. No. 5,409,515, including a porous membrane of a polytetrafluoroethylene and one or more sheets composed of fibers made of a thermally melting synthetic resin. (See Abstract.) The sheets are thermally fused over a selected length. (See Col. Ins. 40–46.)

SUMMARY OF THE INVENTION

It is the general object of the invention to provide an improved filter element made with improved methods and machines for their manufacture.

This object is achieved with a filter element made of at least one nonwoven fabric of a homogeneous mixture of a base and a binder material that is compressed to form a mat or sheet of selected porosity. The binder fiber has at least a surface with a melting temperature lower than that of the base fiber. The sheet is formed into a selected geometric shape and heated to thermally fused to bind the base fiber into a porous filter element. The preferred shape is a helically wound tube of plural sheets, each sheet being self-overlapped and compressed to overlap another sheet. Each sheet preferably heated and compressed individually and the sheets may be selected to have different porosities and densities. The binder material is selected from the group consisting of thermoplastic and resin, and the base material is selected from the group consisting of thermoplastic and natural.

The machinery preferably used to produce the filter element employs the a method of manufacture that includes the step of forming a nonwoven fabric of a homogeneous web of a base fiber and a binder fiber, as explained above, compressed to form a sheet of selected porosity. Plural sheets of nonwoven fabric are wrapped helically on a multi-station wrapping machine with individual belts, each powered by a capstan to form individual layers that overlap to form a laminate. The tension of each belt is selected to compress each layer a selected degree. Each layer is heated to accomplish the thermal fusion step. Cooling fluid is pumped through the hollow mandrel to prevent excessive heat build-up in the mandrel. The machine is controlled by a computer, which receives input signals that adjust machine functions such as the capstan driving motor speed, the tensions of the sheet wrapping belts, the temperature of the heater array used to accomplish thermal fusion of each layer, and the flow of cooling fluid flowing through the hollow mandrel.

The above as well as additional objects, features, and advantages of the invention will become apparent in the following detailed description.

BRIEF DESCRIPTION OF THE DRAWINGS

FIG. 7 is a schematic diagram of a control system used to control the tension of the fabric feed belt of the multi-stage winding machine of FIG. 1.

DETAILED DESCRIPTION OF THE PREFERRED EMBODIMENT

Figure 1:
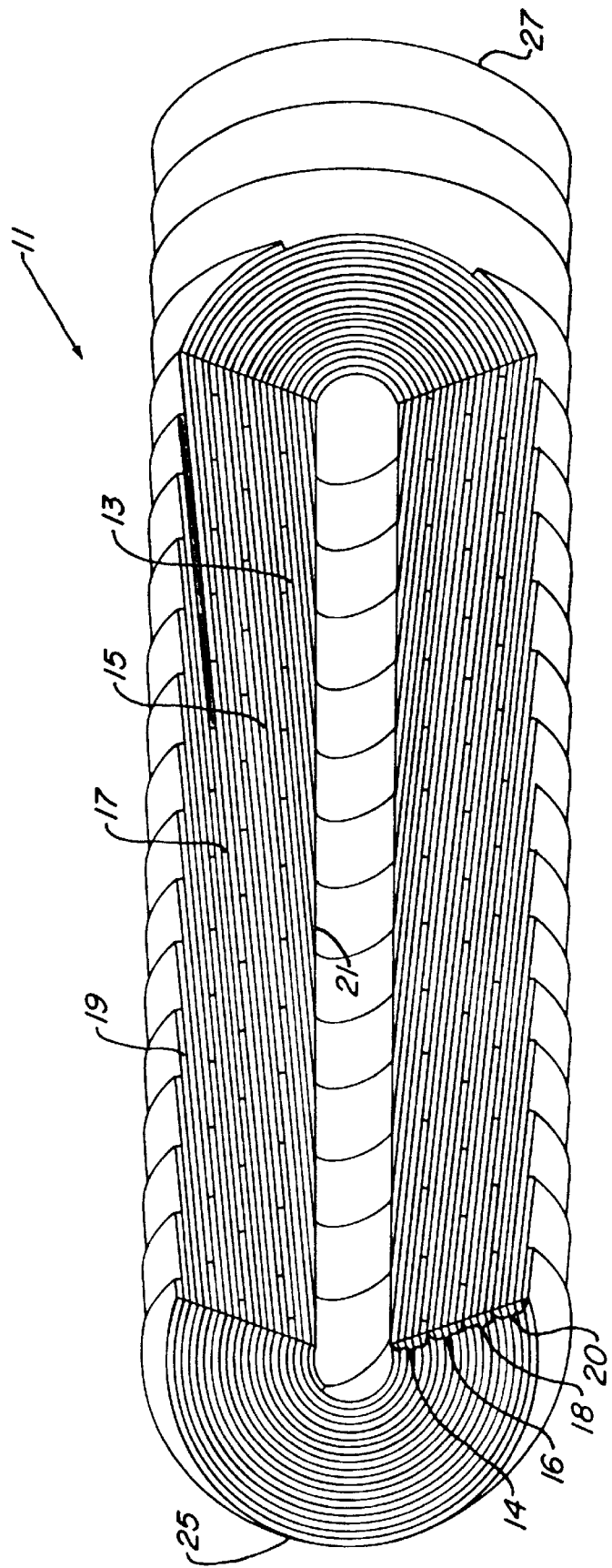
FIG. 1 is a perspective view in partial section of the preferred embodiment of the invention that illustrates a multi-overlapped coreless filter element made in a four station wrapping machine using four rolls of selected non-woven fabric.

Referring to FIG. 1 of the drawings, the numeral 11 designates a multi-overlapped coreless filter element constructed according to the principles of the invention. It includes a first multi-overlapped nonwoven fabric strip 13, a second multi-overlapped nonwoven fabric strip 15, a third multi-overlapped nonwoven fabric strip 17, and a fourth multi-overlapped nonwoven fabric strip 19. Each fabric strip 13, 15, 17, 19 is spirally or helically wound in overlapping layers to form overlapping bands 14, 16, 18, 20, respectively. The radially interior surface 21 of band 14 forms the periphery of an axially extending annular space that extends from one end 25 of the filter element to the oppositely facing end 27 of the filter element 11. In the drawings the thickness of the fabric is exaggerated.

Figure 2:
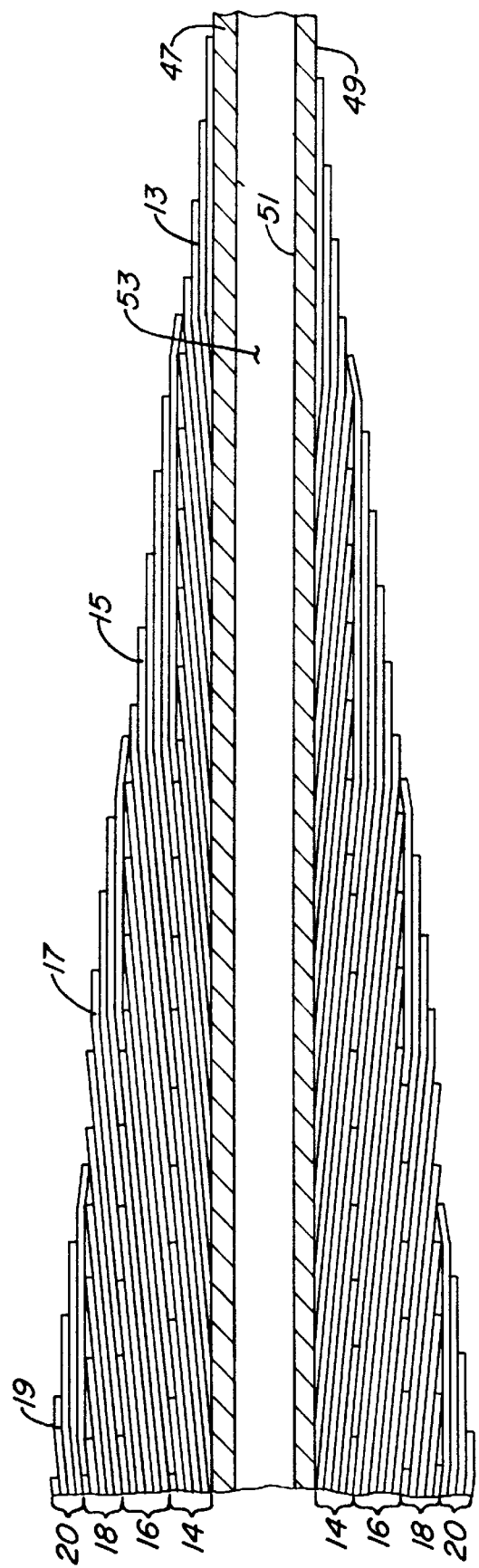
FIG. 2 is a cross-sectional view that illustrates the multi-overlapped coreless filter element of FIG. 1 being formed on a hollow mandrel.

In FIG. 2 of the drawings, the numeral 47 designates a hollow cylindrical mandrel with an annular exterior surface 49 and an annular interior surface 51, said annular interior surface 51 forming the periphery of a cylindrical channel 53, through which flows a liquid or gas heat exchange medium (not shown). Band 14 of multi-overlapped nonwoven fabric strip 13, is shown overlapped by band 16 of multi-overlapped non-woven fabric strip 15, which in turn is overlapped by band 18 of multi-overlapped nonwoven fabric strip 17, which is then overlapped by band 20 of multi-overlapped nonwoven fabric strip 19.

Figure 3:
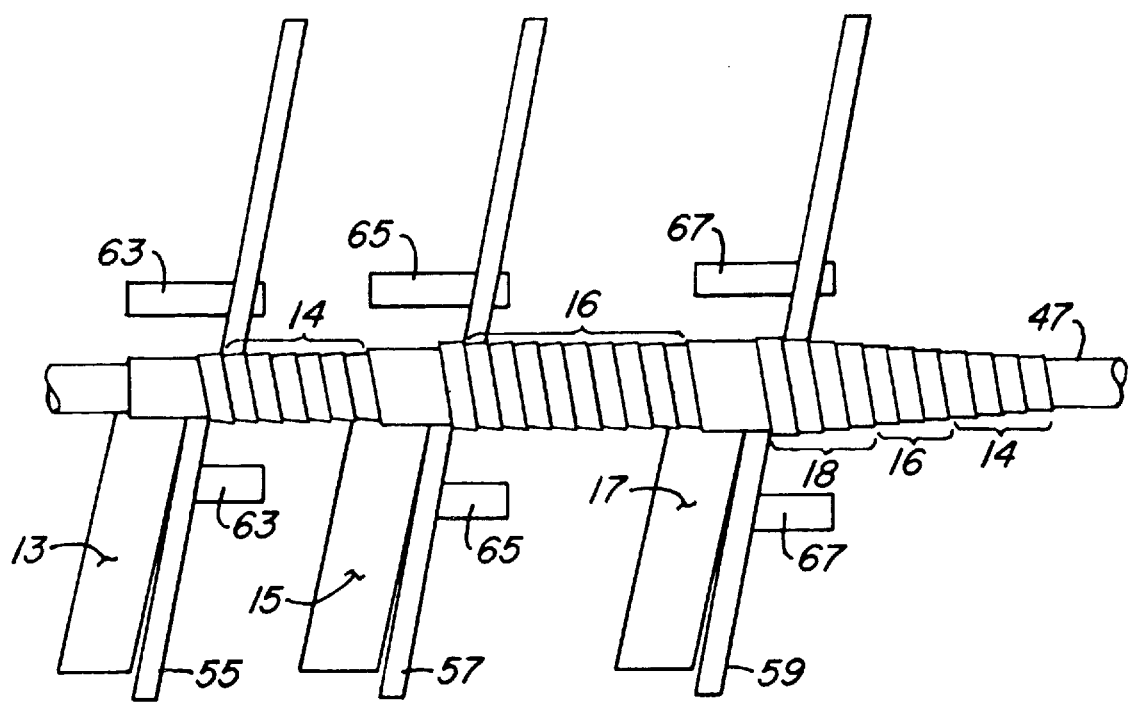
FIG. 3 is a schematic top view of three stations of the machine used to manufacture the filter element of FIG. 1.
Figure 4:
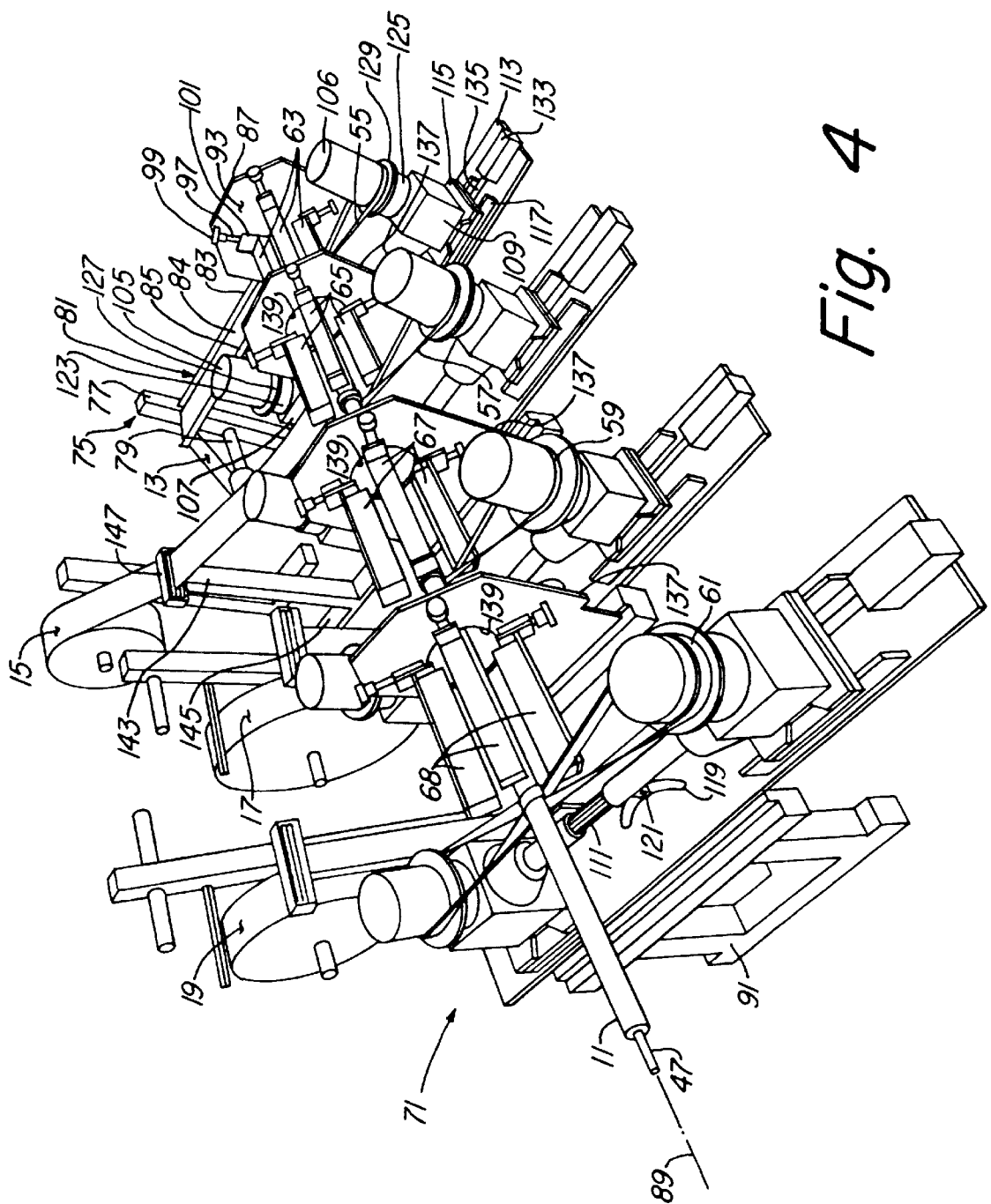
FIG. 4 is a perspective view that illustrates the preferred embodiment of a multi-stage winding machine used to that produce the filter element of FIG. 1.

As shown in FIG. 3 of the drawings, only three stages are shown of the multi-stage winding machine shown in greater detail in FIG. 4. In FIG. 3, a first compression belt 55 is shown wrapping, in a multi-overlapped fashion, nonwoven fabric strip 13 about the hollow mandrel 47. A second compression belt 57 is shown wrapping, in a multi-overlapped fashion, nonwoven fabric strip 15 about multi-overlapped nonwoven fabric strip 13. A third compression belt 59 is shown wrapping, in a multi-overlapped fashion, non-woven fabric strip 17 about multi-overlapped non-woven fabric strip 15. A first heater array of preferably infrared heaters 63 is shown in a position to apply heat, simultaneously with the compression of compression belt 55, to multi-overlapped nonwoven fabric strip 13. A second heater array of infrared heaters 65 is shown in a position to apply heat, simultaneously with the compression of compression belt 57, to multi-overlapped nonwoven fabric strip 15. A third heater array of infrared heaters 67 is shown in a position to apply heat, simultaneously with the compression of compression belt 59, to multi-overlapped nonwoven fabric strip 17.

Referring now to FIG. 4 of the drawings, numeral 71 designates a multi-stage winding machine for manufacturing multi-overlapped coreless filter elements 11. A roll of non-woven fabric strip 13 is shown mounted on a roll support 75 consisting of an upright member 77 onto which are mounted one or more cylindrical roll support shafts 79 extending perpendicularly outward from the upright member 77 to receive the tubular core (not shown) of the roll of non-woven fabric strip 13. Each roll support shaft 79 is connected to the upright member 77 at a point along the length of the upright member 77. The upright member 77 is connected at its base to a plurality of horizontal legs (not shown) which extend perpendicularly outward to such length as to provide support for the upright member 77, each roll support shaft 79, and each roll non-woven the fabric strip 13 loaded onto each roll support shaft 79.

A feed tray 81 consists of a rectangular plate with its two longest opposing edges 83 and 85 each turned up at a right angle so as to form a channel which supports and guides and is adjustable to the width of the nonwoven fabric strip 13. Each stage of the winding machine 71 has a feed tray 81 and a tensioner roller 147 connected to an air cylinder (not shown).

Heater array support 87, a mounting plate for the first heater array 63, stands vertically in a plane which is perpendicular to the axis 89 of the winding machine 71. The heater array support 87 is connected along its base edge to a machine support structure 91 which extends parallel to the axis 89 of the winding machine 71 and supports each stage thereof. The heater array support 87 has an input surface (not shown) and an output surface 93. Connected to the output surface 93 and extending along the axis 89 and through each stage of the winding machine 71 is a hollow mandrel 47. Attached to the input surface of the heater array support 87 is a conduit (not shown) for transporting the heat exchange medium from a pumping device (represented schematically in FIG. 7, numeral 324) to the heater array support 87, through an aperture (not shown) in the heater array support 87, and into the cylindrical channel 53 (see FIG. 2) of the hollow mandrel 47. Connected to the output surface 93 of the heater array support 87 is a plurality of heater actuators 97 each of which consists of a dial adjustment mechanism 99 connected through a gear mechanism (not shown) to a heater actuator plate 101.

Attached to each heater actuator plate 101 and extending outward from the output surface 93 of the heater array support 87 and parallel to the axis 89 of the winding machine 71 is an infrared heater 63. Each infrared heater 63 is attached to a corresponding heater actuator plate 101 in such a fashion as to direct the heat perpendicular to and in the direction of the hollow mandrel 47. Each infrared heater 63 extends outward from the output surface 93 of the heater array support 87 a selected distance.

A pair of capstans consisting of a driving capstan 105 and a driven capstan 106 stand vertically with their axes (not shown) perpendicular to and on either side of the axis 89 of the winding machine 71. The driving capstan 105 is mounted onto a driving capstan gearbox 107 and the driven capstan 106 is mounted onto a driven capstan gearbox 109. The driving capstan gearbox 107 is connected at its base to a gearbox platform 113. The gearbox platform 113 is a rectangular plate that sits atop the machine support structure 91 in a horizontal plane. A capstan driving motor (represented schematically in FIG. 7, numeral 314) is mounted underneath the gearbox platform 113 and has a shaft (not shown) which extends through an aperture (not shown) in the gearbox platform 113 and connects to the gears of the driving capstan gearbox 107. The driving capstan gearbox 107 is connected to the driven capstan gearbox 109 by a splined shaft (not shown in the first-stage, but identical to the splined shaft 111 of the fourth stage) thereby providing a means for driving the capstans 105 and 106 at the same angular speed but in opposing directions.

The driven capstan gearbox 109 is connected at its base to a gearbox sliding plate 115. The underside of the gearbox sliding plate 115 has a plurality of grooves that extend along its length and parallel to the length of the gearbox platform 113. The grooves of the gearbox sliding plate 115 receive the rails of a digital linear encoder 117 thereby allowing the digital linear encoders 117 to incrementally measure the location of the driven capstan 109 along the rails of the digital linear encoder 117 relative to a reference point on the digital linear encoder 117. The digital linear encoder 117 can be of the type disclosed in U.S. Pat. No. 4,586,760 or any other incremental linear measuring device known to persons skilled in the art. Near the center of the gearbox platform 113 and cut through the thickness of the platform is an arc-shaped slot (not shown in the first-stage, but identical to the arc-shaped slot 119 of the fourth stage), the chord of which is parallel to the length of the gearbox platform 113. A gearbox platform adjustment set screw (not shown in the first stage, but identical to the gearbox platform adjustment set screw 121 of the fourth stage) passes through the arc-shaped slot identical to slot 119 and is received into a threaded aperture (not shown) in the machine support structure 91. The angle of the belt 55 relative to the mandrel 47 may be adjusted with this mechanism.

Capstan sleeves 123 and 125 are concentric about the axes of the driving capstan 105 and the driven capstan 106, respectively. The radially interior surfaces of the capstan sleeves 123 and 125 are mated with the radially exterior surfaces of the driving capstan 105 and the driven capstan 106, respectively, and are attached thereto by suitable means at a selected location on the driving capstan 105 and on the driven capstan 106. Annular capstan sleeve flanges 127 and 129 extend radially outward from the driving capstan 105 and the driven capstan 106, respectively.

Compression belt 55 forms a closed loop around one half of the periphery of the driving capstan 105 and one half of the periphery of the driven capstan 106 and is placed in tension by the distance between the axes of the driving capstan 105 and the driven capstan 106. The compression belt crosses over itself a single time between the driving capstan 105 and the driven capstan 106. In addition, the compression belt 55 forms a single spiral around the hollow mandrel 47.

A tensioner air cylinder 133 is mounted onto the gearbox platform 113 at the same end as the driven capstan gearbox 109. The tensioner air cylinder 133 is a commonly used pneumatic cylinder with a shaft 135 that extends from one end of the tensioner air cylinder 133 in parallel with the length of the gearbox platform 113 and is connected at the opposing end to the driven capstan gearbox 109.

Three additional stages of the multi-stage winding machine 71 are shown in FIG. 4. Each such additional stage consists of identical components as the first stage with the exception that the heater array support 137 of each additional stage includes an aperture 139 concentric about the axis 89 of the winding machine 71 through which the hollow mandrel 47 passes with sufficient clearance for bands 14, 16, 18, 20 of the filter element 11; and with the exception that the feed tray 81 is replaced by a feed tensioner 141 consisting of a vertically upright member 143 connected at its base to a plurality of horizontal legs 145 and connected at the opposite end to feed tensioner rollers 147.

Figure 5:
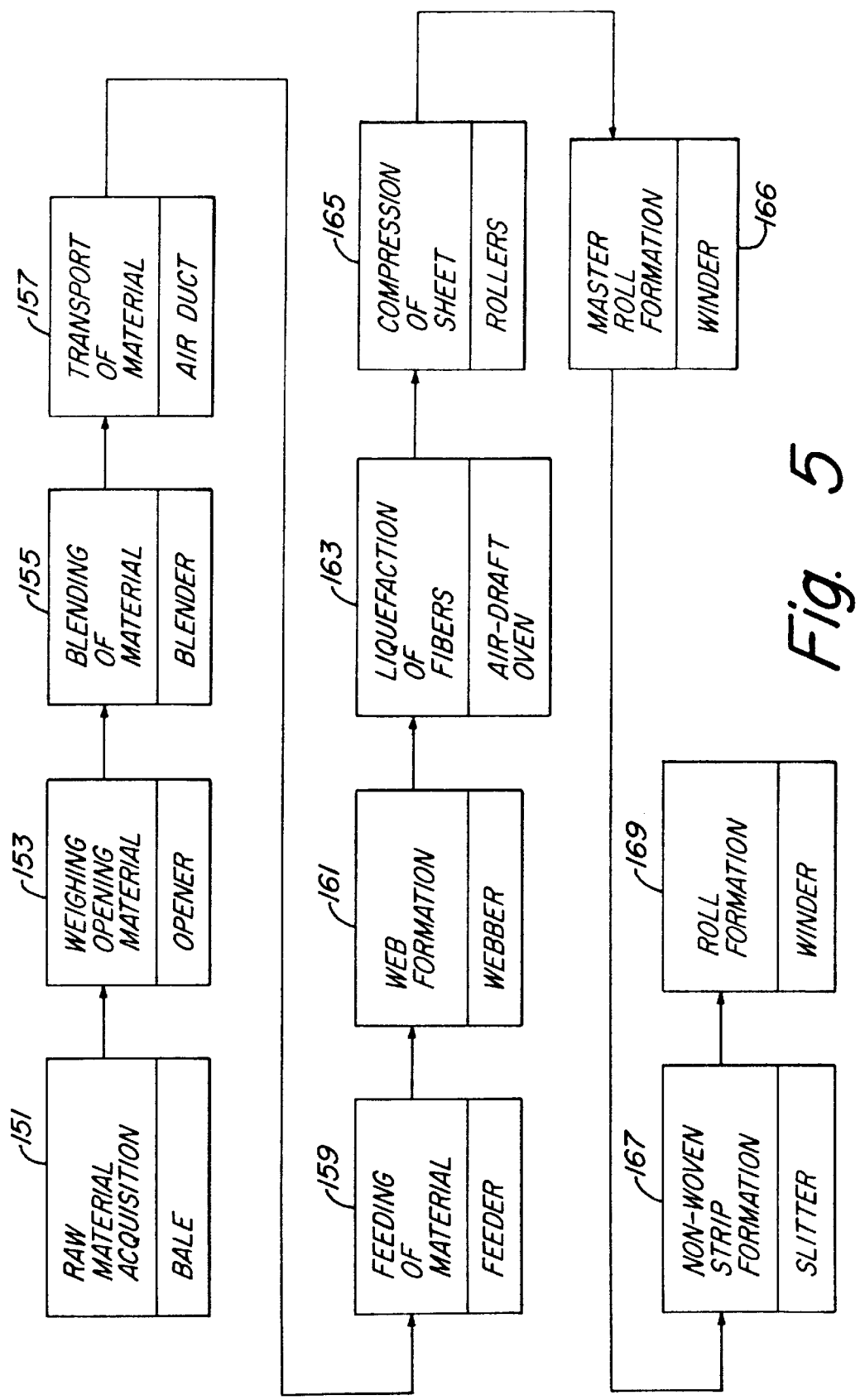
FIG. 5 is a block diagram of the preferred nonwoven fabric manufacturing process used to produce the filter element of FIG. 1.

Referring now to FIG. 5 of the drawings, a block diagram of each step of the manufacturing process of the nonwoven fabric is illustrated. Each significant step of the manufacturing process is depicted in a separate block. In block 151, step 1 is the acquisition of fiber, usually in the form of a bale purchased from a textile fiber producer. Each strip 13, 15, 17, 19 is composed of one or more fibers. If a strip 13, 15, 17, 19 is composed of only one fiber, it should be of the type which consists of a lower melting point outer shell and a higher melting point inner core. If a strip 13, 15, 17 19 is composed of two or more fibers, at least one of the fibers must have a lower melting point than the others or be of the shell and core type mentioned above.

In block 153, step 2 is opening and weighing of the fiber materials. The fibers are transported to a synchro-blender where they are further opened in preparation for final blending in block 155.

In block 155, step 3 is the final blending of the fibers whereby the individual fibers are thoroughly intermixed by a series of cylindrical rollers and lickerins to provide a homogeneous dispersion of fibers. This step is performed in a blender similar to the blender disclosed in U.S. Pat. No. 3,744,092.

In block 157, step 4 is the transportation of the thoroughly mixed fibers via an air duct system consisting of a duct approximately 12 inches in diameter through which air is circulated at a rate of approximately 1,500 feet per minute from the blender to the feeder.

In block 159, step 5 is the feeding of the intermixed fibers into a feeder similar to the feeder disclosed in U.S. Pat. Nos. 2,774,294 and 2,890,497.

Block 161, step 6 is a web formation step in which the fibers are conveyed from the feeder to a webber similar to the webber disclosed in U.S. Pat. Nos. 2,890,497 and 2,703,441, consisting of a plurality of cylindrical rollers and a lickerin such that a continuous web of the homogeneously dispersed fibers is formed.

Block 163, step 7 is a liquefaction and compression step carried out in a series of air-draft ovens and/or alternative heat sources in which a flow of air heated to a selected temperature is blown down onto the web thereby causing liquefaction of all or part of particular types of the homogeneously dispersed fibers as more fully explained hereinafter. Simultaneously with the liquefaction of all or part of particular types of the homogeneously dispersed fibers, is compression of the continuously formed web into a thin sheet. The air in the air-draft ovens is saturated to near 100% with low pressure steam. Liquid water is pumped through pipes into the air-draft ovens where it spilled onto heated stainless steel plates thereby creating low pressure steam. The saturation level required is dependent upon the temperature inside the air-draft ovens which ranges from 200° to 550° Fahrenheit. The steam neutralizes the static electricity created by the air which is recirculated at rates of up to 40,000 cubic feet per minute. There is a pressure differential across the web in the air-draft oven of between 4 and 8 inches of water column. Residence time for the web in the air-draft ovens is dependent upon and coordinated with the discharge rate of the web being produced at the webber.

In block 165, step 8 is the compression of the sheet of homogeneously dispersed fibers into a nonwoven fabric with a thickness required for the desired filtration efficiency by conveying the sheet between two cylindrical stainless steel rollers.

In block 166, step 8-A, is the formation of a roller of the nonwoven fabric on a winder.

In block 167, step 9 of the manufacturing process is the formation of strips from the sheet of nonwoven fabric. Cutting devices are positioned at selected spots across the width of the sheet of nonwoven fabric so as to cut the sheet into a plurality of strips of selected widths thereby forming strips of nonwoven fabric such as 13, 15, 17, 19.

In block 169, step 10 the nonwoven strips 13, 15, 17, 19 are wound onto cores which are in the form of cylindrical tubes on a commonly known winder consisting of a plurality of cylindrical rollers for aligning and winding the strips of nonwoven fabric 13, 15, 17, 19 onto cores.

The entire nonwoven sheet manufacturing process takes place in a humidity-controlled environment. The relative humidity of the air in the environment ranges from 60% to 80% as measured by wet bulb/dry bulb thermometer and an enthalpy chart.

Figure 6:
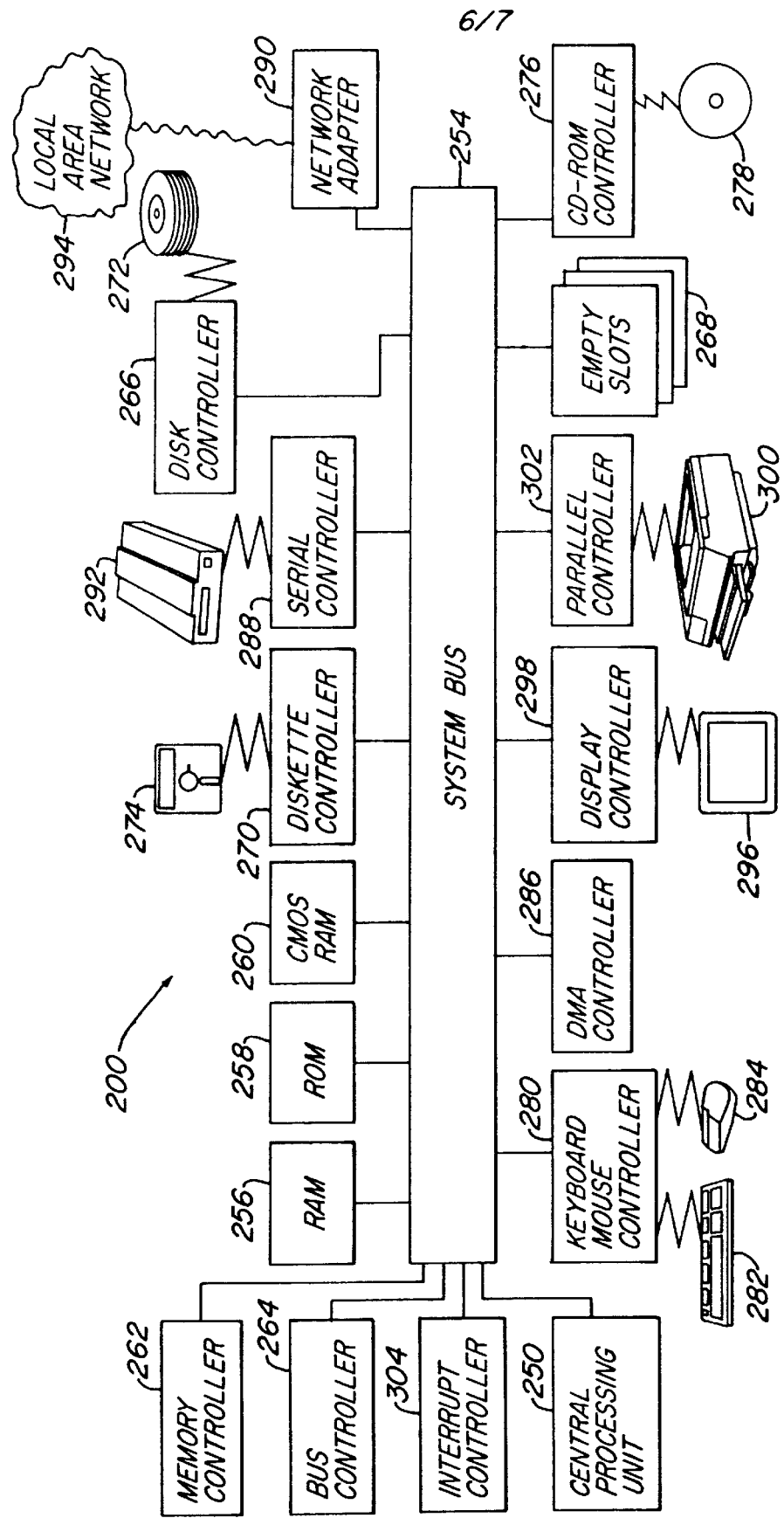
FIG. 6 is a schematic diagram of a computer based system used to control the winding machine of FIG. 4.

Referring now to FIG. 6 of the drawings, a schematic diagram of the preferred computer based data processing and control system of the winding machine 71 is illustrated. It should be understood that the winding machine 71 may be manually operated. Data processing system 200 is controlled primarily by computer readable instructions in the form of software such as Intellution written by Intellution, Inc. of Norwood, Mass. Such software is executed within central processing unit (CPU) 250 to cause data processing system 200 to control selected functions of winding machine 71.

CPU 250 retrieves, decodes, and executes instructions, and transfers information to and from other resources via the computer's main data-transfer path, system bus 254. System bus 254 connects the components in the data processing system 200 and defines the medium for data exchange. System bus 254 typically includes data lines for sending data, address lines for sending addresses, and control lines for sending interrupts and for operating the system bus.

Memory devices coupled to system bus 254 include random access memory (RAM) 256, read only memory (ROM) 258, and nonvolatile memory 260. Such memories include circuitry that allows information to be stored and retrieved. Data stored in RAM 256 can be read or changed by CPU 250 or other hardware devices. ROM 258 contains stored data that cannot be modified. Nonvolatile memory is memory that does not lose data when power is removed from it. Nonvolatile memories include ROM, EPROM, flash memory, bubble memory, or battery-backed CMOS RAM 260. Battery-backed CMOS RAM 260 may be utilized to store system configuration information.

Access to RAM 256, ROM 258, and nonvolatile memory 260 may be controlled by memory controller 262 and bus controller 264. Memory controller 262 may provide an address translation function that translates virtual addresses into physical addresses as instructions are executed. Memory controller 262 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board that includes chips and other electronic components connected in a circuit that adds functions or resources to the computer. Typical expansion cards add memory, disk-drive controllers 266, video support, parallel and serial ports, and internal modems. Thus, empty slots 268 may be used to receive various types of expansion cards.

Disk controller 266 and diskette controller 270 both include special-purpose integrated circuits and associated circuitry that direct and control reading from and writing to a hard disk drive 272 and a floppy disk or diskette 274, respectively. Such disk controllers handle tasks such as positioning read/write head, mediating between the drive and the microprocessor, and controlling the transfer of information to and from memory. A single disk controller may be able to control more that one disk drive.

A CD-ROM controller 276 may be included in the data processing system 200 for reading data from (compact disk read-only memory) CD-ROM 278. Such CD-ROM disks 278 use laser optics rather than magnetic means for reading data. Keyboard mouse controller 280 is provided in the data processing system 200 for interfacing with keyboard 282 and a pointing device, such as mouse 284. Such pointing devices are typically utilized to control an on-screen element, such as a cursor, which may take the form of an arrow having a hot spot that specifies the location of the pointer when the user presses a mouse button.

Direct memory access (DMA) controller 286 may be used to provide a memory access that does not involve CPU 250. Such memory accesses are typically employed for data transfer directly between memory and an "intelligent" peripheral device, such as between RAM 256 and disk controller 266.

Communication between data processing system 200 and other data processing systems may be facilitated by serial controller 288 and network adaptor 290, both of which are coupled to system bus 254. Serial controller 288 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information).

Such a serial interface may be utilized to communicate with modem 292. A modem is a communications device that enables a computer to transmit information over a standard telephone line. Modems convert digital computer signals to analog signals suitable for communication over telephone lines. Modem 292 may provide a connection to other sources of software, such as a file server, an electronic bulletin board, and the Internet or World Wide Web.

Network adaptor 290 may be used to connect the data processing system 200 to a local area network (LAN) 294. LAN 294 may provide computer users with means of communicating and transferring software and information electronically. Additionally, LAN 294 may provide distributed processing, which involves several computers and the sharing of workloads or cooperative efforts in performing a task.

Display 296, which is controlled by display controller 298, is used to display visual output generated by the data processing system 200. Such visual output may include text, graphics, animated graphics, and video. Display 296 may be implemented with a CRT-based video display, an LCD-based flat-panel display, or a gas plasma-based flat-panel display. Display controller 298 includes electronic components required to generate a video signal that is sent to display 296.

Printer 300 may be coupled to the data processing system 200 via parallel controller 302. Printer 300 is used to put text or a computer-generated image onto paper or on another medium, such as a transparency. Other types of printers may include an image setter, a plotter, or a film recorder.

Parallel controller 302 is used to send multiple data and control bits simultaneously over wires connected between system bus 254 and another parallel communication device, such as printer 300. The most common parallel interface is the Centronics interface.

During data processing operations, the various devices connected to system bus 254 may generate interrupts which are processed by interrupt controller 304. An interrupt is a request for attention from CPU 250 that can be passed to CPU 250 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 304 may be required to handle a hierarchy of interrupt priorities and arbitrate simultaneous interrupt requests. Interrupt controller 304 may also be used to temporally disable interrupts.

Referring now to FIG. 7 of the drawings, a schematic diagram of the component control system of the winding machine 71 is illustrated. Component control system 305 is controlled primarily by computer readable instructions in the form of software. Such software is executed within control Programmable Logic Controller (PLC) 306 to activate component control system 305.

The control PLC 306 retrieves, decodes, executes instructions, and transfers information to and from other resources via the component control system's main data-transfer path, logic control bus 308. The logic control bus 308 connects the components in the component control system 305 and defines the medium for data exchange. The logic control bus 308 typically includes data lines for sending data, address lines for sending addresses, and control lines for sending interrupts and for operating the logic control bus 308.

Communication between component control system 305 and data processing system 200 is facilitated by serial controller 288 which is coupled to serial controller 307. Serial controller 288 is utilized to transmit information between the data processing system 200 and the component control system 305, through serial controller 307, one bit at a time over a single line. A plurality of digital logic controllers 310, 311, 313, 315, 317, 319 are in communication with the control PLC 306 via the logic control bus 308.

Digital logic controller 310 is in communication with motor control box 312 which is coupled to and receives data from and transmits operational inputs to one or more capstan driving motors 314 of the winding machine 71. Digital logic controller 311 is in communication with digital linear encoder control box 316 which is coupled to and receives data from one or more digital linear encoders 117 of the winding machine 71. Digital logic controller 313 is in communication with tensioner air cylinder control box 318 which is coupled to and receives data from and transmits operational inputs to one or more tensioner air cylinders 133 of the winding machine 71. Digital logic controller 315 is in communication with heater array control box 320 which is coupled to and transmits operational inputs to heater arrays 63, 65, 67, 68 of the winding machine 71. Digital logic controller 317 is in communication with heat transfer medium pump control box 322 which is coupled to and receives data from and transmits operational inputs to the heat transfer medium pump 324 of the winding machine 71. Digital logic controller 319 is in communication with temperature detecting device control box 323 which is coupled to and receives data from temperature detecting device 326 of the winding machine 71.

Each non-woven fabric strip 13, 15, 17, 19, is composed of selected polymeric fibers such as polyester and polypropylene which serve as both base fibers and binder fibers. Base fibers have higher melting points than binder fibers. The role of base fibers is to produce small pore structures in the coreless filter element 11. The role of the binder fiber or binder material is to bond the base fibers into a rigid filter element that does not require a separate core. The binder fibers may consist of a pure fiber or of one having a lower melting point outer shell and a higher melting point inner core. If the binder fiber is of the pure type, then it will liquify throughout in the presence of sufficient heat. If the binder fiber has an outer shell and an inner core, then it is subjected to temperatures that liquify only the outer shell in the presence of heat, leaving the inner core to assist the base fiber in producing small pore structures. The role therefor of the binder fiber is to liquefy either in whole or in part in the presence of heat, the liquid fraction thereof to wick onto the base fibers to form a bond point between the base fibers, thereby bonding the base fibers together upon cooling. The binder material may be in a form other than fibrous.

Referring now to the preferred embodiment of the invention, the base fibers and binder fibers are blended according to the manufacturing process set forth in FIG. 5 to form rolls of non-woven fabric strips 13, 15, 17, 19, each of a selected composition. Upon completion of the manufacture of rolls of nonwoven fabric strips 13, 15, 17, 19, the rolls thereof are loaded onto the roll support shafts 79 of the roll support 75 at each stage of the winding machine 71. Each roll support 75 is positioned to introduce the non-woven fabric strips 13, 15, 17, 19, at a selected angle to the hollow mandrel 47. The desired specifications for a multi-overlapped coreless filter element 11 are selected via the keyboard 282 or mouse 284 of the data processing system 200. According to the software, the CPU 250 retrieves, decodes, executes instructions, and transmits the appropriate information to the control PLC 306 of the component control system 305. The control PLC 306 retrieves, decodes, executes instructions, and transmits control information to the digital logic controllers 310, 311, 313, 315, 317, 319, which in turn analyze and format the control information. The control information is communicated to the appropriate motor control box 312, tensioner air cylinder control box 318, heater array control box 320, or heat transfer medium pump control box 322, which converts the control information into operational inputs and sends the operational inputs to the appropriate capstan driving motor 314, tensioner air cylinder 133, heater arrays 63, 65, 67, 68, or heat transfer medium pump 324, each of which operates and performs work according to the operational inputs.

A length of the non-woven fabric strip 13 is unrolled and fed over the feed tray 81 such that it lies between the upturned edges 83 and 85 of the feed tray 81. The feed tray 81 is positioned such that the non-woven fabric strip 13 is introduced to the hollow mandrel 47 at a selected angle. According to the operational inputs from the motor control box 312, the capstan driving motor (represented schematically in FIG. 7, numeral 314) turns the gears of the driving capstan gearbox 107 which turns the driving capstan 105. The splined shaft of the first stage of the winding machine 71 transmits power to the driven capstan gearbox 109, the gears of which turn the driven capstan 106 at the same angular speed but in the opposite direction as the driving capstan 105. Friction between the interior surface of the compression belt 55 and the radially exterior surfaces of the driving capstan 105 and the driven capstan 106 allows the belt to turn with the capstans 105 and 106 without tangential slippage. The capstan sleeve flanges 127 and 129 of the capstan sleeves 123 and 125, respectively, prohibit the compression belt 55 from downward slippage on the driving and driven capstans 105 and 106, respectively.

The leading edge 31 of the non-woven fabric strip 13 is then fed between the annular exterior surface 49 of the hollow mandrel 47 and the compression belt 55 at the point where the compression belt 55 makes its single spiral loop around the hollow mandrel 47. Because the friction drag generated between the compression belt 55 and the non-woven fabric strip 13 is greater than the friction drag generated between the non-woven fabric strip 13 and the hollow mandrel 47, the coreless filter element 11 is formed in a conical helix shape and is driven along the hollow mandrel 47 toward the free end thereof. The feed angle between the non-woven fabric strip 13 and the hollow mandrel 47 is such that the non-woven fabric strip 13 overlaps itself a plurality of times as it is compressed between the compression belt 55 and the hollow mandrel 47 producing the multi-overlapped conical helix feature of the present invention. The source of the selected compressive force of the compression belt 55 is the tension in the compression belt 55 which is determined by the selected distance between the axes of the driving capstan 105 and the driven capstan 106. Since the driven capstan 106 is connected to the driven capstan gearbox 109 which is connected at its base to the gearbox sliding plate 115, the driven capstan 106 is free to translate along the rails of the digital linear encoder 117. The digital linear encoder 117 is coupled to a digital linear encoder control box 316 whereby it transmits data to a digital logic controller 311 and a control PLC 306. The digital linear encoder 117 incrementally measures the location of the driven capstan gearbox 109 along the rails of the digital linear encoder 117 relative to a reference point on the digital linear encoder 117 and transmits that information to the component control system 305. The location of the driven capstan gearbox 109 is transmitted to the component control system 305 whereby the speed of the capstan driving motor 314 is calculated and transmitted through the motor control box 312 to the capstan driving motor 314. The compressive force delivered by compression belt 55 to the nonwoven fabric strip 13 is controlled and maintained by a selected pressure in the pneumatic tensioner air cylinder 133, the shaft 135 of which is connected to the base of the driven capstan gearbox 109. The pneumatic tensioner cylinder 133 is coupled to a tensioner air cylinder control box 318 whereby it receives operational inputs from a digital logic controller 313 and a control PLC 306. The pressure in the pneumatic tensioner air cylinder 133 is adjusted according to the operational inputs such that its shaft 135 is either extended or retracted thereby controlling and maintaining the compressive force delivered by compression belt 55 to the nonwoven fabric strip 13.

Applied simultaneously with the aforementioned compression to the multi-overlapped non-woven fabric strip 13 is a selected amount of heat generated by an array infrared heaters 63 located a selected distance from the non-woven fabric strip 13. Each infrared heater 63 is connected to a heater actuator plate 101 which provides for movement of each infrared heater 63 toward or away from the hollow mandrel 47. The dial adjustment mechanism 99 of the heater actuator plate 101 allows for incremental adjustment of the distance between each infrared heater 63 and the hollow mandrel 47. Each infrared heater 63 is coupled to a heater array control box 320 whereby it receives operational inputs from a digital logic controller 315 and a control PLC 306, as to a selected voltage of electricity to be supplied to and maintained at each infrared heater 63 for the purpose of heating the multi-overlapped non-woven fabric strip 13 to a selected temperature such that the base fibers of the multi-overlapped non-woven fabric strip 13 are bonded together both within the strip and between the multi-overlapped layers of band 14 by the wicking process of the liquified binder fibers.

As the non-woven fabric strip 13 is simultaneously heated and compressed to produce the desired porosity, a heat exchange medium is pumped through the cylindrical channel 53 of the hollow mandrel 47 by a pumping device (represented schematically in FIG. 7, numeral 324) at a selected flow rate for the purpose of maintaining a selected temperature on the exterior surface 49 of the hollow mandrel 47. The pumping device is coupled to a heat transfer medium pump control box 322 whereby it receives operational inputs from a digital logic controller 317 and a control PLC 306, as to the selected flow rate to be imparted to the heat exchange medium so as to maintain a selected temperature at the exterior surface 49 of the hollow mandrel 47. One or more temperature detecting devices such as thermocouples (not shown but represented schematically in FIG. 7, numeral 326) are in communication with the heat exchange medium for the purpose of detecting the temperature of the heat exchange medium. Each temperature detecting device is coupled to a temperature detecting device control box 323 whereby it transmits data relating to the temperature of the heat transfer medium to a digital logic controller 319 and a control PLC 306.

The component control system 305 continuously receives and analyzes signals from the capstan driving motor 314, digital linear encoder 117, tensioner air cylinder 133, heat transfer medium pump 324, and the temperature detecting device 326 enabling the component control system 305 to continuously transmit updated operational inputs to the capstan driving motor 314, tensioner air cylinder 133, heater arrays 63, 65, 67, 68, and heat transfer medium pump 324. The data transmitted from the digital linear encoder 117 of each stage of the winding machine 71 is used to calculate and determine the speed of the capstan driving motor 314 of each stage, thereby synchronizing the speed of each capstan driving motor with the first-stage capstan driving motor 314.

The non-woven fabric strip 13 continues to be overlapped upon itself thereby forming band 14 which is driven along the hollow mandrel 47 through the apertures 139 of the heater array supports 137 of each remaining stage of the winding machine 71 in a continuous unending fashion. Once band 14 has passed through all stages of the winding machine 71 a length of the second-stage non-woven fabric strip 15 is unrolled and fed between the feed tensioner rollers 147 of a feed tensioner 141. The leading edge 35 of the non-woven fabric strip 15 is then fed between the compression belt 57 and the annular exterior surface of band 14 at the point where the compression belt 57 makes its single spiral around the hollow mandrel 47.

The nonwoven fabric strip 15 is simultaneously compressed and heated by identical means as the first-stage nonwoven fabric strip 13. The non-woven fabric strip 15 continues to be overlapped upon itself, thereby forming band 16, the annular interior surface of which is bonded to the annular exterior surface of band 14. The combined bands 14 and 16 are driven along the hollow mandrel 47 through the apertures 139 of the heater array supports 137 of each remaining stage of the winding machine 71 in a continuously unending fashion. Once the combined bands 14 and 16 have passed through all remaining stages of the winding machine 71 a length of the third-stage non-woven fabric strip 17 is unrolled and fed between the feed tensioner rollers 147 of a feed tensioner 141. The leading edge 39 of the non-woven fabric strip 17 is then fed between the compression belt 59 and the annular exterior surface of band 16 at the point where the compression belt 59 makes its single spiral around the hollow mandrel 47.

The nonwoven fabric strip 17 is simultaneously compressed and heated by identical means as the first-stage nonwoven fabric strip 13. The non-woven fabric strip 17 continues to be overlapped upon itself, thereby forming band 18, the annular interior surface of which is bonded to the annular exterior surface of band 16. The combined bands 14, 16, 18 are driven along the hollow mandrel 47 through the apertures 139 of the heater array supports 137 of each remaining stage of the winding machine 71 in a continuously unending fashion. Once the combined bands 14, 16, 18 have passed through all remaining stages of the winding machine 71 a length of the fourth-stage non-woven fabric strip 19 is unrolled and fed between the feed tensioner rollers 147 of a feed tensioner 141. The leading edge 43 of the non-woven fabric strip 19 is then fed between the compression belt 61 and the annular exterior surface of band 18 at the point where the compression belt 61 makes its single spiral around the hollow mandrel 47.

The non-woven fabric strip 19 continues to be overlapped upon itself, thereby forming band 20, the annular interior surface of which is bonded to the annular exterior surface of band 18. The combined bands 14, 16, 18, 20 are driven along the hollow mandrel 47 in a continuously unending fashion toward a measuring device (not shown) and a cutting device (not shown). Once the combined bands 14, 16, 18, and 20 have passed through the final stage of the winding machine 71, the filter element 11 is measured by the measuring device and cut to length by the cutting device.

The angular speed of the capstan driving motor is such that the non-woven fabric strips 13, 15, 17, 19 remain in close enough proximity to the infrared heaters 63, 65, 67, 68 for a selected duration of time so as to allow proper liquefaction of the binder fibers. Also, sufficient distance between stages is provided so that the binder fibers are allowed to partially cool thereby bonding the base fibers within each nonwoven strip 13, 15, 17, 19, between each layer thereof, and between each band 14, 16, 18, 20, providing the desired porosity between each layer and between each band 14, 16, 18, 20.

The simultaneous application of selected amounts of heat and compression to the layers of non-woven fabric strips 13, 15, 17, 19, is such that only selected properties are altered resulting in a coreless filter element 11 with sufficient structural strength to be self-supporting, i.e., requiring no structural core, while maintaining the desired porosity.

The simultaneous application of selected amounts of heat and compression to the non-woven fabric strips 13, 15, 17, 19, as described above, allow for systematic variation of the density of the layers of non-woven fabric strips 13, 15, 17, 19, across the wall of the filter element and the systematic variation of the porosity of the base fibers, of the element 11.

The direction of flow of filtrate through the filter element 11 can be either from the core toward the annular outside wall or from the annular outside wall toward the core, but in either case the filtrate flow is generally perpendicular to the axis of the filter element 11. However, due to the conical helix nature of the layers of non-woven fabric strips 13, 15, 17, 19, the pores formed by the bonded base fibers lie at an angle to the axis of the filter element 11 making it more difficult for large particles of filtrate to pass through the filter element 11.

The filter element 11 may be finished by capping the ends 25 and 27 by any suitable means known to persons skilled in the art, such as potting in a polymeric resin.

A cable-activated kill switch (not shown) extends over the length of the winding machine 71 for the purpose of halting the winding machine 71.

An example of the method and means of manufacturing a filter element of the type shown in FIG. 1 is as follows: Four different types of fibers were purchased from Hoechst Celanese of Charlotte, N.C., sold under the fiber designation "252," "121," "224," and "271". Fiber "252" was of the core and shell type, whereas fibers "121," "224," and "271" were of the single component pure type. The denier of fiber "252" was 3 and its length was 1.500 inches. The denier of fiber "121" was 1 and its length was 1.500 inches. The denier of fiber "224" was 6 and its length was 2.000 inches. The denier of fiber "271" was 15 and its length was 3.000 inches. A first blend of fibers was manufactured from fiber "121" and fiber "252" composed of 50% by weight of each fiber type. A second blend of fibers was manufactured from fiber "224" and fiber "252" composed of 50% by weight of each fiber type. A third blend of fibers was manufactured with a composition of 25% by weight of fiber "121" and 25% by weight of fiber "224" and 50% by weight of fiber "252". A fourth blend of fibers was manufactured from fiber "271" and fiber "252" composed of 50% by weight of each fiber type. Fiber "252" being of the core and shell type served as the binder fiber in each of the aforementioned blends. Each blend of fibers was manufactured according to the process set forth in FIG. 5. Each blend of fibers was formed into a web which was approximately ½ inch in thickness. The thickness of each web was reduced by approximately 50% forming a mat during its residence time of ninety seconds in the air draft ovens due to the recirculation of steam-saturated air at approximately 40,000 cubic feet per minute at a temperature of 400 degrees Fahrenheit. There was a differential pressure across the mat in the air draft ovens of 6 inches of water. Upon exiting the air draft ovens, each mat was fed between two stainless steel cylindrical rollers which compressed the thickness of each mat by approximately 50% into a sheet of nonwoven fabric with a width of about 37 inches. Each 37-inch wide sheet of nonwoven fabric was cut into 6-inch wide strips 13, 15, 17, 19. The basis weight of each sheet of nonwoven fabric was determined and to be in the range of 0.5 to 1.2 ounces per square foot. As a quality assurance step, once the strips of nonwoven fabric were cut, they were tested on a Frasier air flow tester to determine air permeability in cubic feet per minute per square foot. The strips of nonwoven fabric 13, 15, 17, 19 were then loaded onto the roll support shafts 79 of the roll support 75, one roll at each stage of the winding machine 71.

The specifications of the strips of nonwoven fabric 13, 15, 17, 19 were input into the data processing system 200 with the keyboard 282 and the mouse 284. The hollow mandrel 47 was made of stainless steel and had a nominal outside diameter of 1 inch. The heat transfer medium pumping device 324 was started and began pumping the heat transfer medium through the hollow mandrel 47 at varying flow rates such that the temperature of the annular exterior surface 49 of the hollow mandrel 47 was maintained at 200 degrees Fahrenheit, according to data transmitted from the temperature detecting device 326 to the component control system 305 and operational inputs from the component control system 305. The first-stage capstan driving motor 314 was started at a control speed of approximately 50 hertz, as instructed by the component control system 305. The first-stage heater array 63 was turned on and supplied with a voltage of electricity sufficient to create a temperature at the hollow mandrel 47 of 300 degrees Fahrenheit.

The first band 14 of nonwoven fabric strip 13 was initiated by feeding the nonwoven fabric strip 13 between the hollow mandrel 47 and the first-stage compression belt 55. The nonwoven fabric strip 13 was helically wound in an overlapping fashion upon itself forming band 14 as it was driven under the compression belt 55 and along the hollow mandrel 47. As the outside diameter of band 14 increased, the driven capstan 106 moved toward the driving capstan 105 so as to shorten the distance therebetween and maintain a pressure of 10 pounds per square inch exerted on band 14 from compressed belt 55. This compression pressure was a result of the tension in the compression belt 55 which was developed by the pressure in the tensioner air cylinder 133 of 50 pounds per square inch gage. The movement of the driven capstan 106 was accomplished by altering the pressure in the tensioner air cylinder 133. The digital linear encoder 117 detected the movement of the driven capstan 106 thereby transmitting the outside diameter of band 14 to the component control system 305 so that appropriate modifications to the speed of the capstan driving motor 314 could be made by the component control system 305. The temperature created by the infrared heater 63 was the "ironing point" temperature. This ironing point temperature of 300 degrees Fahrenheit assisted compression and bonding of the base fibers between the layers of band 14. Under this simultaneous application of heat and compression, the thickness of the strips of nonwoven fabric 13 was compressed by approximately 50% and there existed interlayer bonding.

The band 14 was allowed to travel through each stage of the winding machine 71 and prior to encountering the compression belt at each stage, the capstan driving motor at that stage was turned on and set to the speed of the first-stage capstan driving motor 314 via operational inputs from the component control system 305.

Once the band 14 progressed through all stages of the winding machine 71, the second band 16 of nonwoven fabric strip 15 was initiated by feeding the nonwoven fabric 15 between the second-stage compression belt 57 and the annular exterior surface of band 14. The nonwoven fabric 15 was helically wound in an overlapping fashion upon itself forming band 16 as it was driven under compression belt 57 and along the hollow mandrel 47. The second-stage heater array 65 was turned on and supplied with a voltage of electricity sufficient to maintain an ironing point temperature of 300 degrees Fahrenheit at the annular exterior surface of band 16. As the outside diameter of band 16 increased, the second-stage driven capstan moved toward the second-stage driving capstan so as to shorten the distance therebetween and maintain a pressure of 10 pounds per square inch exerted on band 16 from compression belt 57. This compression pressure was a result of the tension in the compression belt 57 which was developed by the pressure in the second-stage tensioner air cylinder of 50 pounds per square inch gage. The movement of the second-stage driven capstan was accomplished by altering the pressure in the second-stage tensioner air cylinder. The second-stage digital linear encoder detected the movement of the second-stage driven capstan thereby transmitting the outside diameter of band 16 to the component control system 305 so that appropriate modifications to the speed of the second-stage capstan driving motor could be made by the component control system 305 to synchronize the speed of the second-stage capstan driving motor with the first-stage capstan driving motor 314. The ironing point temperature of 300 degrees Fahrenheit assisted compression and bonding of the base fibers between the layers of band 16. Under this simultaneous application of heat and compression, the thickness of the nonwoven fabric strip 15 was compressed by approximately 50% and there existed interlayer bonding. The annular interior surface of band 16 was bonded to the annular exterior surface of band 14 and band 16 progressed along the hollow mandrel 47 toward the third-stage compression belt 59. The band 16 was allowed to travel through the remaining stages of the winding machine 71 and prior to encountering the compression belt at each stage, the capstan driving motor at that stage was turned on and set to the speed of the second-stage capstan driving motor 314 via operational inputs from the component control system 305.

Once the band 16 progressed through all the stages of the winding machine 71, the third band 18 of nonwoven fabric 17 was initiated by feeding the nonwoven fabric strip 17 between the third-stage compression belt 59 and the annular exterior surface of band 16. The nonwoven fabric 17 was helically wound in an overlapping fashion upon itself forming band 18 as it was driven under compression belt 59 and along the hollow mandrel 47. The third-stage heater array 67 was turned on and supplied with a voltage of electricity sufficient to maintain an ironing point temperature of 300 degrees at the annular exterior surface of band 18. As the outside diameter of band 18 increased, the third-stage driven capstan moved toward the third-stage driving capstan so as to shorten the distance therebetween and maintain a pressure of 10 pounds per square inch exerted on the band 18 from compression belt 59. This compression pressure was a result of the tension in the compression belt 59 which was developed by the pressure in the third-stage tensioner air cylinder of 50 pounds per square inch gage. The movement of the third-stage driven capstan was accomplished by altering the pressure of the third-stage tensioner air cylinder. The third-stage digital linear encoder detected the movement of the third-stage driven capstan thereby transmitting the outside diameter of band 18 to the component control system 305 so that appropriate modifications to the speed of the third-stage capstan driving motor could be made by the component control system 305 to synchronize the speed of the third-stage capstan driving motor with the first-stage capstan driving motor 314. The ironing point temperature of 300 degrees Fahrenheit assisted compression and bonding of the base fibers between the layers of band 18. Under this simultaneous application of heat and compression, the thickness of nonwoven fabric strip 17 was compressed by approximately 50% and there existed interlayer bonding. The annular interior surface of band 18 was bonded to the annular exterior surface of band 16 and band 18 progressed along the hollow mandrel 47 toward the fourth stage compression belt 61. The band 18 was allowed to travel through the remaining stage of the winding machine 71 and prior to encountering the fourth-stage compression belt, the fourth-stage capstan driving motor was set to the speed of the third-stage capstan driving motor via operational inputs from the component control system 305.

Once the band 18 progressed through all the remaining stage of the winding machine 71, the fourth band 20 of nonwoven fabric strip 19 was initiated by feeding the nonwoven fabric strip 19 between the fourth-stage compression belt 61 and the annular exterior surface of band 18. The nonwoven fabric strip 19 was helically wound in an overlapping fashion upon itself forming band 20 as it was driven under compression belt 61 and along the hollow mandrel 47. The fourth-stage heater array 68 was turned on and supplied with a voltage of electricity sufficient to maintain an ironing point temperature of 300 degrees at the annular exterior surface of band 20. As the outside diameter of band 20 increased, the fourth-stage driven capstan moved toward the fourth-stage driving capstan so as to shorten the distance therebetween and maintain a pressure of 10 pounds per square inch exerted on the band 20 from compression belt 61. This compression pressure was a result of the tension in the compression belt 61 which was developed by the pressure in the fourth-stage tensioner air cylinder of 50 pounds per square inch gage. The movement of the fourth-stage driven capstan was accomplished by altering the pressure of the fourth-stage tensioner air cylinder. The fourth-stage digital linear encoder detected the movement of the fourth-stage driven capstan thereby transmitting the outside diameter of band 20 to the component control system 305 so that appropriate modifications to the speed of the fourth-stage capstan driving motor could be made by the component control system 305 to synchronize the speed of the fourth-stage capstan driving motor with the first-stage capstan driving motor 314. The ironing point temperature of 300 degrees Fahrenheit assisted compression and bonding of the base fibers between the layers of band 20. Under this simultaneous application of heat and compression, the thickness of nonwoven fabric strip 19 was compressed by approximately 50% and there existed interlayer bonding. The annular interior surface of band 20 was bonded to the annular exterior surface of band 18 and band 20 progressed along the hollow mandrel 47 toward the measuring and cutting devices whereby it was measured and cut to a length of 30 inches.

The resulting filter element 11 had a 1-inch nominal inside diameter, a 2.5-inch nominal outside diameter and was cut to 30 inches long. It weighed one pound and had an airflow capacity of 20 cubic feet per minute, producing a 4.9 inches of water column differential pressure.

In an alternate embodiment of the invention, an idler belt may be included at one or more stages of the multi-stage winding machine 71 so as to maintain the hollow mandrel 47 in a properly fixed position.

In an alternate embodiment of the invention, a plurality of non-woven fabric strips are added in a single stage of the multi-stage winding machine 71.

While the invention is shown in only one of its forms, it is not just limited but is susceptible to various changes and modifications without departing from the spirit thereof.

We claim:

1. A coreless filter element comprising:
   a nonwoven fabric comprising a substantially homogeneous mixture of a base fiber and a binder material compressed to form a first nonwoven fabric strip of selected porosity;
   the first nonwoven fabric strip being spirally wound upon itself in multiple overlapping layers to form a first band having a selected radial thickness;
   a second nonwoven fabric comprising a substantially homogeneous mixture of a base fiber and a binder fiber compressed to form a second nonwoven fabric strip of selected porosity which differs from the porosity of the first fabric strip;
   the second fabric strip being spirally wound upon itself in multiple overlapping layers to form a second band having a selected radial thickness;
   the first and second bands being overlapped and bonded to form a porous, self-supporting filter element.

2. A coreless filter element comprising:
   a nonwoven fabric comprising a substantially homogeneous mixture of a base fiber and a binder material compressed to form a first nonwoven fabric strip of selected porosity;
   the binder material having at least a surface with a melting temperature lower than that of the base fiber, the base fiber and the binder material being thermally fused at a temperature to melt at least the surface of the binder material to bind the base fibers, when the fabric is cooled, into the first nonwoven fabric strip;
   the first nonwoven fabric strip being spirally wound upon itself in multiple overlapping layers to form a first band having a selected radial thickness;
   a second nonwoven fabric comprising a substantially homogeneous mixture of a base fiber and a binder fiber compressed to form a second nonwoven fabric strip of selected porosity;
   the binder material of the second nonwoven fabric having at least a surface with a melting temperature lower than that of the base fiber, the base fiber and the binder material being thermally fused at a temperature to melt at least the surface of the binder material to bind the base fibers, when the sheet is cooled, into the second nonwoven fabric strip;
   the second fabric strip being spirally wound upon itself in multiple overlapping layers to form a second band having a selected radial thickness;
   the first and second bands being overlapped and bonded to form a porous, self-supporting filter element.

3. The coreless filter element of claim 2, wherein the first and second nonwoven fabric strips are helically wound and thermally fused and compressed to form a tubular filter element.

4. The coreless filter element of claim 3, wherein the first and second nonwoven fabric strips have differing porosities.

5. The coreless filter element of claim 4, wherein the filter element is comprised of three or more overlapped bands of multi-overlapped nonwoven fabric strips.

6. A coreless filter element comprising:
   a nonwoven fabric comprising a substantially homogeneous mixture of a base fiber and a binder material thermally fused and compressed to form a first nonwoven fabric strip of selected porosity;
   the binder material having at least a surface with a melting temperature lower than that of the base fiber, the base fiber and the binder material being thermally fused at a temperature to melt at least the surface of the binder material to bind the base fibers, when the fabric is cooled, into the first nonwoven fabric strip;
   the first nonwoven fabric strip being spirally wound upon itself in multiple overlapping layers to form a first band having a selected radial thickness and an axial length;
   at least a second nonwoven fabric comprising a substantially homogeneous mixture of a base fiber and a binder fiber thermally fused and compressed to form a second nonwoven fabric strip of selected porosity;
   the binder material of the second nonwoven fabric having at least a surface with a melting temperature lower than that of the base fiber, the base fiber and the binder material being thermally fused at a temperature to melt at least the surface of the binder material to bind the base fibers, when the fabric is cooled, into the second nonwoven fabric strip;
   the second fabric strip being spirally wound upon itself in multiple overlapping layers to form a second band having a selected radial thickness;
   the second fabric strip being overlapped along at least a portion of the axial length of the first fabric strip and again fused at a temperature to melt at least a surface of the binder material in the nonwoven fabric strips to bind the base fibers of the first and second bands into a porous, self-supporting filter element.

7. The coreless filter element of claim 6, wherein the first and second nonwoven fabric strips are helically wound and thermally fused and compressed to form a tubular filter element.

8. The coreless filter element of claim 7, wherein the first and second nonwoven fabric strips have differing porosities.

9. The coreless filter element of claim 8, wherein the filter element is comprised of three or more overlapped bands of multi-overlapped nonwoven fabric strips.

10. The coreless filter element of claim 9, wherein each band includes at least three overlapped layers which give the band the selected radial thickness.

11. The coreless filter element of claim 10, wherein each band includes five overlapped layers which give the band the selected radial thickness.

* * * * *